Sept. 9, 1969  G. E. REEDER, JR  3,465,631
SELF-SHARPENING SLITTER
Filed Oct. 6, 1966
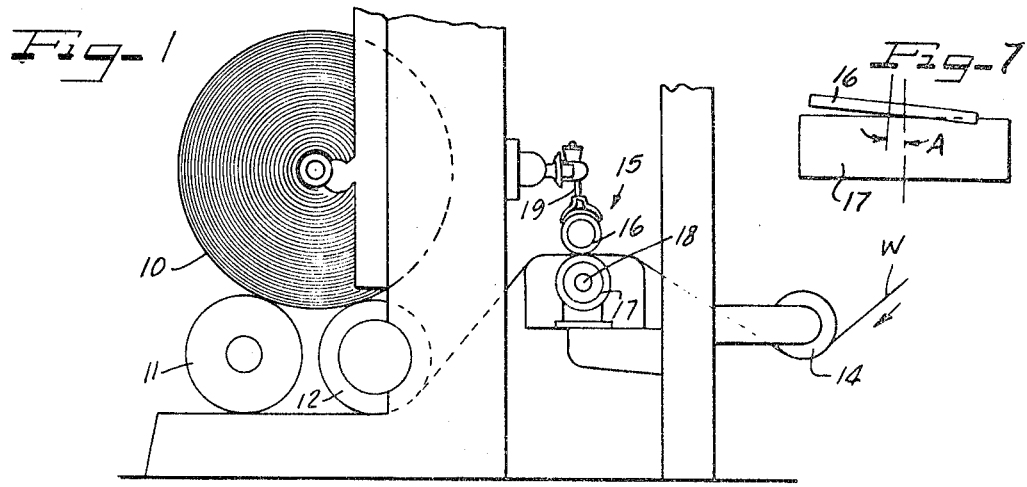
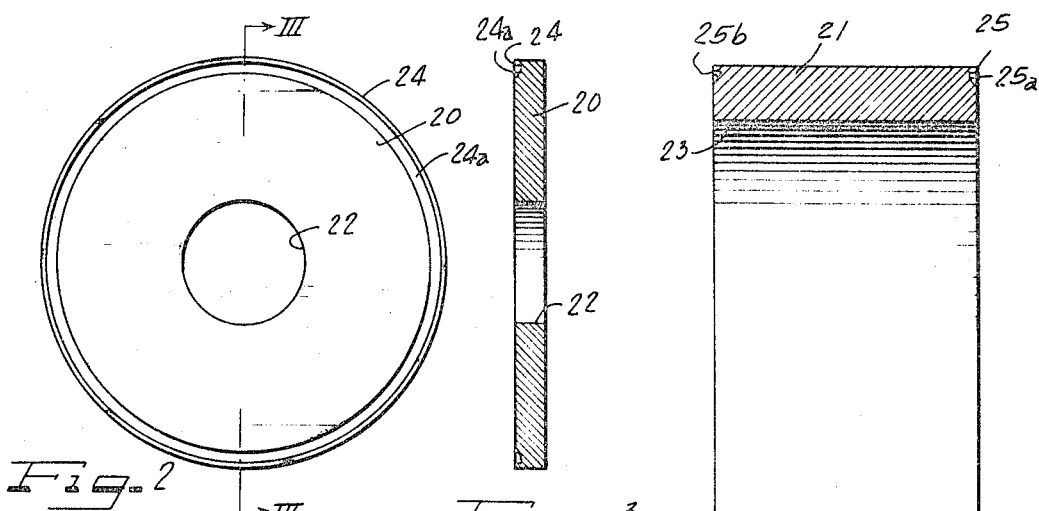
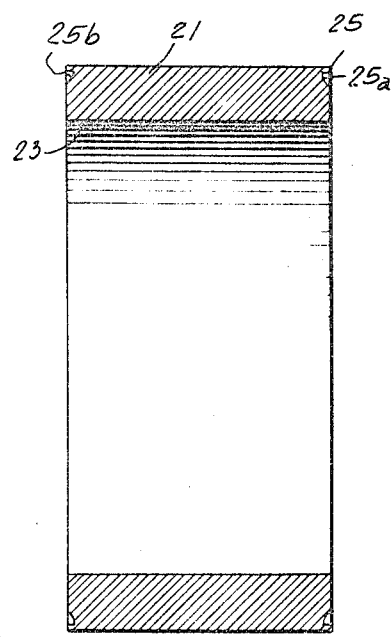
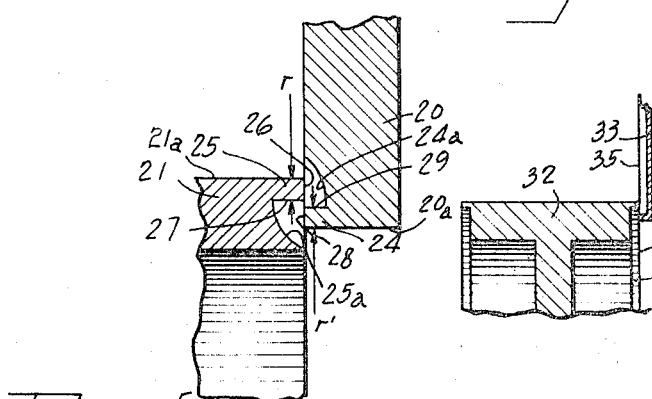
INVENTOR.
GEORGE E. REEDER, JR.
BY  ATTORNEYS

United States Patent Office 3,465,631
Patented Sept. 9, 1969

3,465,631
SELF-SHARPENING SLITTER
George E. Reeder, Jr., Newark, Del., assignor to Beloit Eastern Corporation, Downingtown, Pa., a corporation of Delaware
Filed Oct. 6, 1966, Ser. No. 584,734
Int. Cl. B23d 19/04; B26d 1/24
U.S. Cl. 83—500                                    3 Claims

ABSTRACT OF THE DISCLOSURE

A continuous slitter including a rotatable band and a rotatable blade each of which members has formed on a radial wall thereof an axially projecting annularly shaped cutting profile which overlaps in a radial direction the cutting profile formed on the other member.

---

The present invention relates to the art of shearing sheet materials and is more particularly concerned with rotary slitter apparatus embodying a pair of opposed shearing surfaces which coact to continuously slit a travelling web.

Slitting apparatus of the kind known as shear slitters is employed on paper winder unwinder mechanisms and generally comprises a rotating band and a rotating blade which overlap and coact to slit the web. A plurality of blade and band units are positioned at locations across the web to form a number of slit strips and the band and blade overlap and are held against each other with a predetermined slitting pressure. Paper rolls of different types are placed on the unwinder winder machine with the web to be slit into a number of usable strips. Such slitting to be successfully accomplished commercially must be done at high speeds and the slit formed in the web must be smooth and uniform.

Problems exist in maintaining a uniform shearing operation in a machine having a long operating life at the high speeds which must be encountered. Web speeds approaching six thousand feet per minute are normally expected and the slitting mechanism must operate by forming a smooth edge in the web which is not feathered or jagged. Further slitting members have conventionally been expensive to purchase and maintain and frequent repair or replacement was necessary to maintain a satisfactory slitting edge of the bands and blades.

It is accordingly an object of the present invention to provide an improved slitter arrangement wherein opposed slitter members have a structure providing a more smooth uniform slitting operation than heretofore available.

Another object of the invention is to provide an improved slitting mechanism for a paper unwinder winder apparatus which is less expensive to maintain and replace, avoiding the high cost of replacement or frequent sharpening that has been necessary in devices heretofore available.

Another object of the invention is to provide an improved slitter arrangement for a travelling paper web wherein the slitter members retain a completely satisfactory cutting edge over a long period of operation without becoming rapidly dulled so as to result in unsatisfactory operation with a feathered or jagged cutting edge and the resultant production of dust on the surface of the web. Such surface dust has been highly undesirable in papers which are to be printed.

It is an important feature of the present invention to provide a blade and band slitter arrangement which avoids necessitating frequent change for resharpening and permits replacement instead of resharpening at a substantially less cost than heretofore possible.

While the features and objectives of the invention are especially well suited for use in a paper web slitter employing a shear band and blade, and will for convenience be described in this environment, it will be understood that the structural features of the unique slitter arrangement may in many circumstances be embodied in other types of slitting arrangements. While the preferred form is embodied in a paper web slitter it will be understood that where applicable the description and claims are to be interpreted to cover other types of slitters.

Other objects, advantages and features will become more apparent with the teaching of the principles of the present invention in connection with the disclosure of the preferred embodiments thereof in the specification, claims and drawings, in which:

FIGURE 1 is a side elevational view shown somewhat schematically of a slitter and winder arrangement;

FIGURE 2 is a side elevational view of a slitter blade constructed in accordance with the principles of the present invention;

FIGURE 3 is a vertical sectional view taken substantially along line III—III of FIGURE 2;

FIGURE 4 is a vertical sectional view taken through a slitter band constructed in accordance with the principles of the present invention;

FIGURE 5 is an enlarged fragmentary view showing the slitting area of a coacting band and blade;

FIGURE 6 is a fragmentary enlarged view showing the slitting area of a band and blade of a modified form; and FIGURE 7 is a top plan view of members 16 and 17 of FIGURE 1.

ON THE DRAWINGS

FIGURE 1 shows a roll 10 being wound of slit web material such as paper. The roll 10 is supported on a pair of parallel horizontal rotating drums 11 and 12 with the web W passing over the drum 12 onto the roll 10.

The web W is received from an unwinding roll, not shown, and passes over a guide roll 14 to pass through the slitters 15. The slitters incorporate a slitting blade 16 coacting with a slitting band 17. The band is arranged for rotational movement to be driven either by being mounted directly on the shaft of a driving motor or on a shaft which is driven at a predetermined speed relative to the speed of travel of the web W.

The blade 16 is mounted for rotational movement and can have free rotation or rotate with movement of the web and is carried on an overhead support 19 which is arranged to be able to set the depth of penetration of the slitting blade into the web (that is the depth of overlap between the band and blade), and the shear angle. The overhead carrier 19 is also usually arranged so that the blade is held against the side of the band with a predetermined slitting pressure. The blade rotates about an axis generally parallel to the band although the axis is preferably arranged so that a shear angle indicated at reference character A in FIG. 7 is formed between the band and blade such as in the range of 5 to 55 minutes.

A slitter blade 20 is shown in FIGURES 2 and 3 being circular in shape and having an opening 22 through the center for mounting on a rotatable supporting bearing. The blade has an annular land or profile 24 at its outer peripheral edge on one side (a profile can be provided on both sides of the blade if desired) which is formed by cutting a recess 24a inwardly from the profile 24 into the axial surface of the blade 20.

FIGURE 4 shows a slitter band 21 adapted to coact with the blade 20. The band has a circular opening 23 thereto for mounting on a shaft for rotation. At the outer peripheral edge on one side is an annular land or profile 25 formed by cutting a recess 25a radially inwardly of the profile. The opposite side of the band may be formed with a similar profile as shown at 25b.

The blade 20 and band 21 are shown in coacting relationship in FIGURE 5 with the lands or profiles 24 and 25 arranged in overlapping slitting relation. As previously stated, the band and blade are rotatable on generally parallel axes which deviate from being parallel only in the slitting angle used.

The profile 25 has a radially inwardly facing surface 27 which represents the axial depth of the profile. The profile also has an annular, planar, axially facing surface 26. The radial dimension or radial thickness of surface 26 may be designated dimension $r$.

The blade has a radially inwardly facing surface 29 and an axially facing, annular, planar surface 28. The radial dimension or radial thickness of the surface 28 may be designated as dimension $r'$.

The profile surfaces 26 and 28 are set to overlap as illustrated in FIGURE 5 a predetermined distance. This distance should be a minimum of the sum of radial dimensions $r$ plus $r'$. That is, the outer periphery 20a of the blade 20 should project downwardly past the outer periphery 21a of the band at the point of deepest overlap an amount equal at least to the radial depth of both of the lands.

A sharp cutting edge will remain at the point of engagement of the peripheral surfaces 26 and 28. This will insure continued smooth cutting without the forming of a ragged edge and without the formation of paper dust.

While the profiles 24 and 25 are shown of substantially the same depth, it will be understood that either of the units may be made with a profile deeper than the other in some instances.

FIGURE 6 shows different arrangement wherein a lightweight thinner blade 33 is provided with an axially projecting profile or land 35 at its outer edge. The blade 33 is preferably stamped, that is formed by a stamping manufacturing operation so as to be lightweight and inexpensively made.

The band 32 in FIGURE 6 is also shown of lightweight construction with an annular land or profile 34 formed by a recess 36 radially inwardly of the land in the face of the band. In some installations the band may also be adapted to be light in weight such as being made by a stamping process.

While the entire blade and band of each of the arrangements of FIGURES 5 and 6 may be formed of hardened material, it is desirable that the profiles or lands be hardened and form a very hard longwearing cutting surface. A particularly preferred arrangement is where one of the profiles is made harder than its coacting profile. With this relationship the softer profile will wear away while the hardened profile will have very slow wear. The softer profile will be the first to wear out and the member on which it is carried will be replaced, obviating necessity of removing both of the slitting members.

In a typical arrangement, the blade 33 may be formed with a profile 35 which is softer than the profile 34 of the band 32. The profile of the blade 35 will thus be the first to wear out, and when this has occurred the blade will be removed and thrown away and a new blade installed without the necessity of removal of the band 32.

Thus it will be seen that there has been provided an improved slitter arrangement which meets the objectives and advantages above set forth. The structure accomplishes an improved slitting operation and achieves a longer less expensive operating life.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. An apparatus for a continuous slitter in a travelling web unwinder-winder arrangement comprising a rotatable slitter band member having an annular cutting profile at one side projecting axially from the side of the band formed by an axial recess in the band spaced radially inwardly of the outer periphery of the band, and a rotatable slitter band member coactingly engaging with the band at a predetermined cutting pressure having an annular cutting profile at one side projecting axially from the side of the blade toward the band formed by an axial recess in the blade spaced radially inwardly of the outer periphery of the blade so that said profiles coactingly engage in a slitting zone as the blade rotates on an axis positioned so that the blade and band engage each other at a predetermined shear angle and said profiles wear axially during slitting operation, said profiles entirely overlapping one another such that each is disposed radially inwardly of the other with respect to the member on which the other is formed, the overlap of the profiles being greater than the depth of the sum of the radial dimensions of the profiles.

2. An apparatus for a continuous slitter in a travelling web unwinder-winder arrangement comprising a rotatable slitter band member having an annular cutting profile at one side projecting axially from the side of the band formed by an axial recess in the band spaced radially inwardly of the outer periphery of the band, and a rotatable slitter band member for coactingly engaging with the band at a predetermined cutting pressure having an annular cutting profile at one side projecting axially from the side of the blade toward the band formed by an axial recess in the blade spaced radially inwardly of the outer periphery of the blade so that said profiles coactingly engage in a slitting zone as the blade rotates on an axis positioned so that the blade and band engage each other at a predetermined shear angle and said profiles wear axially during slitting operation, said profiles in the center of said slitting zone each being spaced completely radially inwardly of the other with respect to the member on which the other is formed to provide a radial gap between said profiles.

3. A slitter blade adapted for use with a continuous slitting apparatus in a travelling web unwinder-winder arrangement and for coaction with a rotatable band having an annular cutting profile at one side projecting axially from the side of the band and formed by a recess in the band spaced inwardly of the outer periphery of the band, said blade comprising a circular disk adapted to be mounted for rotation for coactingly engaging with the band at a predetermined cutting pressure and having an annular cutting profile at one side for projecting axially from the side of the blade toward the band with the profile formed by a recess in the blade spaced radially inwardly of the outer periphery thereof so that the blade profile coactingly abuts the band profile in an axial direction as the blade rotates on an axis, which axis is positioned so that the blade and the band engage each other at a predetermined shear angle, and so that the blade profile in its entirety is spaced radially inwardly of the band profile in respect of the axis of rotation of said band to provide a radial gap between said profiles.

References Cited

UNITED STATES PATENTS

| 2,367,974 | 1/1945 | Stocker | 83—500 X |
| 3,173,326 | 3/1965 | Gulliksen et al. | 83—501 |
| 3,186,282 | 6/1965 | Waterhouse | 83—500 X |

FOREIGN PATENTS

| 21,544 | 1894 | Great Britain. |
| 114,942 | 4/1918 | Great Britain. |
| 415,163 | 8/1934 | Great Britain. |

JAMES M. MEISTER, Primary Examiner

U.S. Cl. X.R.

83—676